US011014535B2

(12) United States Patent
Simlett et al.

(10) Patent No.: US 11,014,535 B2
(45) Date of Patent: May 25, 2021

(54) SHARED VEHICLE SECURITY

(71) Applicant: EYGS LLP, London (GB)

(72) Inventors: John Simlett, London (GB); Philipp Wolfgang Schartau, London (GB); Kulraj Singh Smagh, Coventry (GB); Tristram Musa Benson, Cambridge (GB); Michael Stefan Yorke, Cheshire (GB); Samuel Davies, Sawbridgeworth (GB); Stuart Barrass, London (GB)

(73) Assignee: EYGS LLP, London (GB)

( * ) Notice: Subject to any disclaimer, the term of this patent is extended or adjusted under 35 U.S.C. 154(b) by 0 days.

(21) Appl. No.: 16/634,690

(22) PCT Filed: Jul. 27, 2018

(86) PCT No.: PCT/GB2018/052135
§ 371 (c)(1),
(2) Date: Jan. 28, 2020

(87) PCT Pub. No.: WO2019/021021
PCT Pub. Date: Jan. 31, 2019

(65) Prior Publication Data
US 2020/0231122 A1    Jul. 23, 2020

(30) Foreign Application Priority Data

Jul. 28, 2017    (GB) .................................. 1712172

(51) Int. Cl.
*B60R 25/24*        (2013.01)
*H04W 4/40*        (2018.01)
(Continued)

(52) U.S. Cl.
CPC .............. *B60R 25/24* (2013.01); *B60R 25/25* (2013.01); *B60R 25/32* (2013.01); *H04L 9/14* (2013.01); *H04L 63/061* (2013.01); *H04W 4/40* (2018.02)

(58) Field of Classification Search
CPC ...................................... B60R 25/24
See application file for complete search history.

(56) References Cited

U.S. PATENT DOCUMENTS 10,187,793 B2 *  1/2019  Petel ................... H04L 63/0492
10,580,240 B2 *  3/2020  Caterino ............ G07C 9/00309
(Continued)

FOREIGN PATENT DOCUMENTS

WO    WO-2011/109460 A2    9/2011

OTHER PUBLICATIONS

International Searching Authority, International Search Report and Written Opinion for International Application No. PCT/GB2018/052135, dated Nov. 6, 2018, (15 pages), European Patent Office, Rijswijk, Netherlands.

*Primary Examiner* — K. Wong
(74) *Attorney, Agent, or Firm* — Alston & Bird LLP

(57) ABSTRACT

A vehicle comprising: a locking mechanism for securing the vehicle; a user input device exposed to the exterior of the vehicle; a transceiver for communicating with a network external to the vehicle; and a processor configured for implementing a public/private key security algorithm and coupled to the transceiver for sending and receiving data by means of the transceiver, and coupled to the locking mechanism for disengaging the locking mechanism to permit access to the vehicle; the processor being configured to: receive from the transceiver a data block including a first token, the first token representing a public key of a user; receive from the user input device a second token; compare the first and second tokens to determine whether the second (Continued)

token is consistent with having been derived from a private key that forms a key pair with the public key; and if that determination is positive, cause the locking mechanism to be disengaged.

9 Claims, 1 Drawing Sheet

(51) Int. Cl.
*B60R 25/25* (2013.01)
*B60R 25/32* (2013.01)
*H04L 9/14* (2006.01)
*H04L 29/06* (2006.01)

(56) References Cited

U.S. PATENT DOCUMENTS

| | | |
|---|---|---|
| 10,791,444 B2* | 9/2020 | Kuenzi .................. H04W 4/80 |
| 2016/0086175 A1 | 3/2016 | Finlow-Bates et al. |
| 2017/0046669 A1 | 2/2017 | Chow et al. |
| 2017/0096123 A1 | 4/2017 | Gennermann et al. |

* cited by examiner

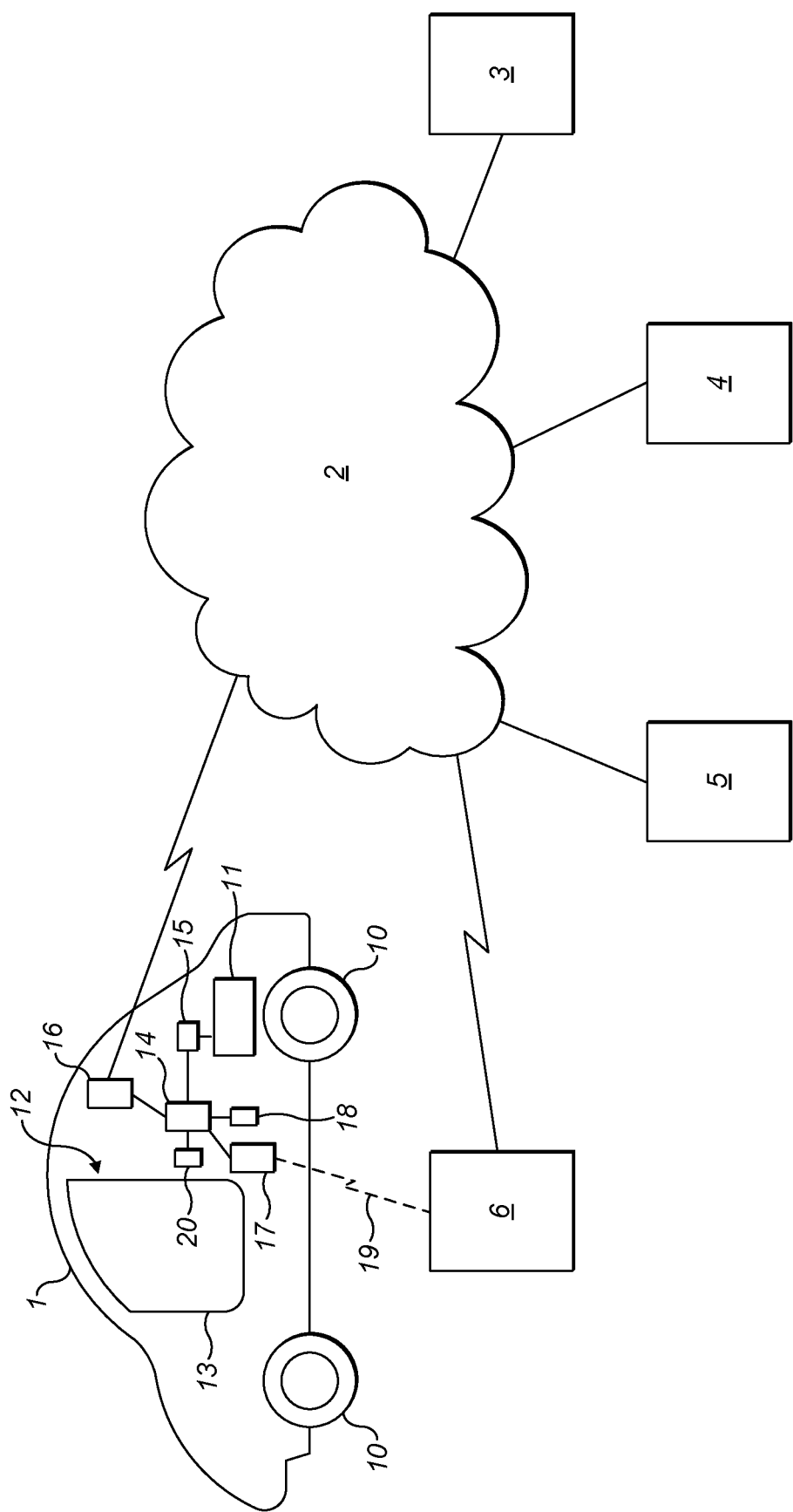

SHARED VEHICLE SECURITY

CROSS REFERENCE TO RELATED APPLICATIONS

This application is a National Stage Application, filed under 35 U.S.C. § 371, of International Application No. PCT/GB2018/052135, filed Jul. 27, 2018, which international application claims priority to and the benefit of United Kingdom Application No. 1712172.4, filed Jul. 28, 2017; the contents of both of which as are hereby incorporated by reference in their entireties.

BACKGROUND

Related Field

This invention relates to the security of vehicles, for example shared vehicles.

At present, most automobiles are privately owned and are used exclusively by their owners. For much of the time these vehicles are unused. There are some limited opportunities to share the usage of automobiles: for example taxis, car share arrangements and car hire companies. These schemes can increase the proportion of time for which an individual vehicle is used, which can reduce overall costs to the users. It is anticipated that in the future there will be increased demand for shared vehicle usage schemes, especially in urban areas.

Description of Related Art

In order to administer a shared usage scheme, a number of contractual arrangements and physical security protocols need to be put in place. If there are multiple vehicle owners in the scheme then there is a need to maintain a register of who provides each vehicle. There may need to be a way for users to reserve access to vehicles. There needs to be a mechanism for ensuring that vehicles can only be accessed by authorised users, and there needs to be a way to manage payments from users to the provider(s) of the vehicles. In existing vehicle share schemes these issues are either managed by dedicated staff who are associated with a vehicle's provider (as in taxi and conventional car hire schemes), or there is a single vehicle provider who operates a private database through which contractual and physical security aspects are managed (as in current car share schemes). In the future, it may be desirable for to facilitate a different model. In that model, an individual vehicle owner might want to own a vehicle for their private use, but to permit others to use the vehicle for a fee at times when the owner does not require to use it. In this model, there might be no staff to manage the scheme and it would be impractical for an individual owner to operate their own private management database. There is a need for an improved way of managing vehicle security, for example to at least partially address this problem.

BRIEF SUMMARY

Blockchain protocols provide for a distributed database comprising an ordered chain of data blocks. Each block links to the previous block in the chain and contains data to confirm the integrity of the previous block. In some blockchains the chain may be validated collectively by nodes that participate in the protocol. In that way, the need for a centralised administrator in order to preserve the authenticity of the database is avoided. The blocks in a blockchain may contain records which hold user data that is to be memorialised. The user data may be raw information or it may be a set of instructions for implementing a future transaction. Such a set of instructions is known as a smart contract.

According to a first aspect there is provided a vehicle comprising: a locking mechanism for securing the vehicle; a user input device exposed to the exterior of the vehicle; a transceiver for communicating with a network external to the vehicle; and a processor configured for implementing a public/private key security algorithm and coupled to the transceiver for sending and receiving data by means of the transceiver, and coupled to the locking mechanism for disengaging the locking mechanism to permit access to the vehicle; the processor being configured to: receive from the transceiver a data block including a first token, the first token representing a public key of a user; receive from the user input device a second token; compare the first and second tokens to determine whether the second token is consistent with having been derived from a private key that forms a key pair with the public key; and if that determination is positive, cause the locking mechanism to be disengaged.

The data block may be part of a data corpus authenticated by a distributed authentication protocol. The processor may be configured to participate in the protocol to collaboratively authenticate data in the data corpus.

The protocol may be a blockchain protocol.

The protocol may be such that data in the data corpus is authenticated through a consensus protocol.

The locking mechanism may be arranged to secure an external door of the vehicle.

The locking mechanism may be arranged for securing a motive power source of the vehicle.

The user input device may be configured to receive input through contact; for example by contact with one or more input devices. The or each input device may, for example, be movable keys, a touch-sensitive screen or a fingerprint reader. Accepting input from a contact-sensitive device may provide reassurance that the entity providing the input is physically present at the vehicle. The user input device may be mounted to the vehicle. The user input device may be exposed to the exterior of the vehicle.

The user input device may be a biometric reader.

The data block may form part of a series of commonly authenticated data blocks. The processor may be configured to detect usage of the vehicle and to add data to the series, the data being indicative of the usage of the vehicle.

The data indicative of the usage of the vehicle may be representative of one or more of: distance travelled by the vehicle, fuel consumed by the vehicle, acceleration of the vehicle, deceleration of the vehicle, maximum speed of the vehicle.

According to a second aspect there is provided a method for operating a vehicle comprising a locking mechanism for securing the vehicle, a user input device exposed to the exterior of the vehicle, a transceiver for communicating with a network external to the vehicle, and a processor configured for implementing a public/private key security algorithm and coupled to the transceiver for sending and receiving data by means of the transceiver, and coupled to the locking mechanism for disengaging the locking mechanism to permit access to the vehicle; the method comprising the processor performing the steps of: receiving from the transceiver a data block including a first token, the first token representing a public key of a user; receiving from the user input device a second token; comparing the first and second tokens to determine whether the second token is consistent with having been derived from a private key that forms a key pair with the public key; and if that determination is positive, causing the locking mechanism to be disengaged.

BRIEF DESCRIPTION OF THE FIGURES

The present invention will now be described by way of example with reference to the accompanying drawing. In the drawing:

FIG. 1 illustrates the physical architecture of a vehicle share system.

FIG. 1 shows components of a vehicle share scheme. The scheme involves a vehicle 1 which can communicate with a communications network 2. Other devices 3, 4, 5 and 6 can also communicate with the network. In this example, device 6 is a smartphone of a user of the scheme.

DETAILED DESCRIPTION OF VARIOUS EMBODIMENTS

The vehicle 1 has ground-engaging wheels 10, at least some of which can be driven by a motive power unit 11. The motive power unit could be an internal combustion engine, an electric motor or any other source of drive, or a hybrid of multiple such drive sources. There could be one motive power unit which drives all the driven wheels, or there could be individual motive power units arranged to drive respective wheels, as in the case of wheel motors.

The vehicle has an occupant cabin indicated at 12. The occupant cabin can be accessed through an occupant door 13. A locking mechanism 20 acts on the door 13. The locking mechanism has a locked configuration in which it locks the door 13 so that the door cannot be opened from outside the vehicle; and an unlocked configuration in which the door 13 is unlocked and can be opened to enable someone outside the vehicle to gain entry to the occupant cabin 12. The locking mechanism may be a mechanical lock, a magnetic lock or any other suitable form of lock. Conveniently it is an automotive door lock module of generally conventional type. The locking mechanism can be controlled by a processor 14 to switch between its locked and unlocked states. For example, an electrically operated component such as a solenoid or motor in the locking mechanism may be operable electrically to cause the locking mechanism to switch states. That component may be coupled to the processor 14 so that the processor can operate it.

The vehicle has a security module 15. The security module acts as an interface between the processor 14 and the motive power unit 11. The security module is capable of enabling or disabling the motive power unit so as to permit the motive power unit to drive the vehicle or to prevent the motive power unit from driving the vehicle. The security module may be coupled to the processor 14 in such a way that the processor can cause it to switch between enabling or disabling the motive power unit. If the motive power unit comprises an internal combustion engine then the security module could permit or block fuel flow to the engine, or permit or block ignition current. If the motive power unit comprises an electric drive motor then the security module could disable drive current to that motor. Thus, the security module can lock the vehicle from driving.

The vehicle has a transceiver 16. The transceiver is capable of transmitting data to and receiving data from network 2. The transceiver's connection to network 2 may be a wireless connection such as a radio or optical connection. It could use a wired connection, but that is less preferred because it may require someone to make a physical connection to the vehicle. Conveniently the connection is a cellular radio connection, for example using a 4G or 5G protocol. The transceiver is coupled to the processor 14 so that the processor can receive data that the transceiver has received over the network, and so that the processor can provide the transceiver with data to be transmitted over the network. The network 2 may be or comprise a wireless network such as a cellular radio network, a publicly accessible network such as the internet and/or one or more local area networks.

The vehicle has a user input device 17, which is coupled to the processor. The function of the user input device will be described in more detail below.

The processor has access to a memory 18. The memory stores in a non-transient way program instructions that can be executed by the processor to permit it to perform the functions described of it herein. The memory also stores any data needed temporarily by the processor.

The nodes 3, 4, 5 may be smartphones, servers or other computing devices. They may be the processors of other vehicles, analogous to processor 14 of vehicle 1. As will be described in more detail below, they are configured to be capable of participating in a security protocol by helping to authenticate a corpus or chain of data.

Node 6 is a portable electronic device such as a smartphone. It may also be configured to be capable of participating in the security protocol. Furthermore, it may be capable of interacting with the user input device 17 via a wireless link 19, as will be described in more detail below.

The operation of the system will now be described. The computer devices 3, 4, 5 and other similar devices connected to network 2 cooperate to operate and administer a blockchain and/or distributed ledger protocol. The protocol is such that the devices cooperating in the protocol collectively authenticate blocks of data that are added to a corpus or chain of data. New blocks could be authenticated in response to them being from a trusted source. Alternatively, they could be authenticated through consensus protocols such as proof of work or proof of stake. In the event that there is disagreement between the participating nodes as to which is the authoritative version of the corpus or chain of data the protocol may be designed such that the majority view of the participating nodes, or the view associated with the most work, may prevail. The protocol could, for example, be or be based on Ethereum, Monax or Openchain. The processor 14 of vehicle 1 can access, via the network 2, the corpus of data that has been authenticated through the cooperative protocol. For convenience, this corpus will be referred to as a blockchain in the description below, but it should be understood that although the system may use a blockchain protocol it may alternatively use a protocol other than a blockchain protocol.

The provider of vehicle 1 operates a computer that participates in the protocol, for example computer 3. From time to time the provider may enter into an agreement with a third party (e.g. the user of smartphone 6) under which that third party is to have use of vehicle 1. The financial details of that transaction are not material to the present invention. However, it would be convenient—once that agreement has been made—for the third party to have automated access to the vehicle. In the system to be described below, this is achieved as follows:

The provider adds to the blockchain an amount of data that indicates that the user may have access to the vehicle, together with information to permit the user to be identified/authenticated. The added data may also include data defining limitations on the user's use of the vehicle, for example times or places when or where the user may or may not use the vehicle.

The participants in the security protocol validate the provider's addition, e.g. through a consensus protocol such as proof of work or proof of stake.

The vehicle downloads the provider's addition by means of the interface 16. The vehicle's processor 14 checks that the addition has been validated. If it has been validated, the processor stores the details of the user and their permitted use of the vehicle in memory 18. The vehicle's processor may also verify that the addition has indeed been made by the provider. It may do this by verifying a cryptographic signature of the provider in the addition, or by communicating directly with the provider over network 2.

The user approaches the vehicle and inputs credentials to the vehicle by means of user interface 17. Those credentials may be data entered on a keypad, data transmitted from device 6 or biometric data sensed by the user interface.

The vehicle's processor 14 attempts to validate the user's credentials against the information given by the provider to permit the user to be identified/authenticated. If the user is successfully identified/authenticated and the present circumstances match those given by the provider (e.g. the current time is within a window when the user may use the vehicle) then the processor operates locks 20, 15 to permit the user to have use of the vehicle.

When the user has finished with the vehicle and/or when the circumstances in which the user may use the vehicle do not obtain, the processor 14 operates the locks 20, 15 to disable use of and/or access to the vehicle.

The provider may transmit information permitting further users to use the vehicle in a similar manner.

Initially, the provider ("P"), the user ("U") and the vehicle ("V") may each have public/private key pairs. The key pair for each participant is generated such that it can be used in an asymmetric key authentication protocol. A first function is defined. It takes a test value and one of the private keys as input, and generates an intermediate value. A second function is defined. It takes as input the intermediate value and the respective public key, and generates the test value. The first function is such that the private key cannot be recovered with a practical level of computation from knowledge of the test value and the intermediate value. The second function and the complexities of the first and second keys are such that when second function outputs the test value there is confidence that the public key used as input to the second function forms a correct key pair with the private key used as input to the first function. In this way, the public/private keys can be used to authenticate an individual. Suitable examples of the first and second functions and methods for generating public/private key pairs are widely known. P, U and V may have access to each other's public keys. V stores its private key in memory 18. V also stores in memory 18 the identity of P, e.g. P's public key, in order that it can trust instructions from P to permit a user access to the vehicle, and prevent other entities from instructing the vehicle to make itself available to users.

When P enters into an agreement with U for use of the vehicle, P adds a record to the corpus of data that is collectively authenticated by devices 3, 4, 5 etc. In one example, that record may comprise the following elements:

An identification of V. This permits V to identify that this record is relevant to it. V may be identified by a unique identity allotted to it. That may be a unique identity particular to the present system, or an identity of wider scope such as its vehicle identification number or registration number. The unique identity of V is stored in memory 18.

An identification of the activities permitted under the agreement. This may include any one or more of: (i) parameters specifying the time of the permitted use, e.g. a start time from which U is to be permitted use of the vehicle and/or an end time after which U is not to be permitted use of the vehicle; and (ii) parameters specifying the practical nature of the permitted use, e.g. maximum distance to be driven, region in which driving is permitted;

An identification of the user U. Preferably this is provided in a format such that the vehicle V may verify user U when they present themselves at the vehicle.

Data authenticating that the record has been generated by P. This may, for example, be generated by a conventional public/private key signing algorithm using P's private key. For example, it may be the result of processing a hash of the record (or a predetermined subset of it) together with the private key of P in the first function described above.

The devices 3, 4, 5 etc. collectively verify the addition of the record to the corpus of data, e.g. through a consensus protocol such as proof of work or proof of stake.

The processor 14 is configured to periodically download the corpus of data and analyse it to determine whether any of the records newly added to it pertain to the vehicle 1. That can be determined by checking whether, for each record, it specifies the unique identity of V. If such a record is found then the processor analyses the record to authenticate whether it was generated by P. It does this by means of the public/private key signing algorithm. For example, it may use the second function to process the authentication data field of the record together with the public key of P, and it may compare the result of that with a hash it has computed locally over the record or a predetermined subset of it. If the two match then the record can be assumed to have been authenticated to P and the vehicle can trust that it can provide access on the basis set out in the record. In that case, the vehicle V stores the record in memory 18.

When the user U is ready to use the vehicle, they approach the vehicle and authenticate themselves to the vehicle. The manner in which this can be done will be described in more detail below. The processor 14 of vehicle may also—when it has authenticated user U as being present—provide the user with access to the activities defined in the relevant record. That may involve comparing the current time with a window of times given in the record at which the user may be permitted access to the vehicle, to verify that the user may be permitted access at the current time. To provide the user with use of the vehicle, the processor 14 performs one or both of (i) controlling the door lock 20 to enter an unlocked state in which the door 13 can be opened, permitting the user access to the vehicle and (ii) enabling the drive management system 15 to provide motive power to the vehicle. In this way, the vehicle can be automatically enabled to provide the user with the use of the vehicle, without the need for the user to have a special key for the vehicle, without the need for an encrypted communication channel between the provider and the vehicle and without the need for a private centralised database to administer the system.

When the user finishes using the vehicle the processor 14 controls the door lock 20 to lock the door 13 and/or controls the drive management system 15 to prevent drive being applied to the vehicle.

Whilst the user is using the vehicle, or thereafter, the processor 14 of the vehicle may form a record indicating the level of use of the vehicle that has been made, for example the distance driven, whether the vehicle has entered certain zones such as road charging zones, the maximum speed of the vehicle, the maximum acceleration of the vehicle, the amount of fuel used by the vehicle and the current fuel level of the vehicle. The vehicle's processor 14 may transmit that data over network 2 so as to add it to the blockchain. The provider of the vehicle may than utilise that data to help determine a fee for the use of the vehicle. The fee may be administered through the distributed authentication protocol as a smart contract.

Individual users of the system may, for example wish to provide a vehicle for use by others, to withdraw a vehicle from use, to query the state of a vehicle, to reserve a vehicle for use, to unlock a vehicle so they can drive it, to return a vehicle so it is available for others to use or to report information about a vehicle (e.g. that it has developed a fault). These functions may be performed in a number of ways. In each case, the user may have access to a computing device which runs an application for receiving input from the user, presenting output to the user and transmitting and receiving information to and from one or more centralised or distributed storage areas. In one example, the application may participate directly in a blockchain or distributed ledger protocol. It may be able to add new blocks to the blockchain or ledger, and participate in authenticating a blockchain or ledger through proof of work or proof of state. In this example, the blockchain or ledger itself may store information introduced by the user of that device. For example, the user may indicate that they have started or finished using a particular vehicle. The state of that vehicle may then be represented directly by data in the blockchain or distributed ledger. In an alternative example, there may be an intermediate level of storage in which at least some real-time data of the system is stored. This intermediate storage may be a trusted database. The blockchain or distributed ledger may indicate the database and/or the location of relevant information stored in it. In this implementation the user's device can query the blockchain or ledger for the latest information about a particular vehicle. The blockchain or ledger stores a record indicating the trusted database and/or location where the latest information on that vehicle is stored. Updates to information regarding the vehicle, which may be introduced by the user in question or by a different user, can be made in the database. The database's authority can be revoked by a new block being introduced to the blockchain or distributed ledger which indicates a new trusted location for that vehicle. This approach has the advantage that it may be quicker for a user to access or change information about a particular vehicle. In another approach, the database can be used as a temporary cache, and changes to the database can be propagated in due course to the blockchain or ledger.

The user U may be authenticated to the vehicle V in a number of ways. These may differ depending on (i) what user interface apparatus 17 is available to the vehicle, (ii) what apparatus for performing authentication is available to the user and (iii) the content of the user identification field of the record authorising the user to use the vehicle. Some examples will be given below.

1. In one example, the user interface apparatus may be a fingerprint reader. The fingerprint reader may be exposed at the exterior of the vehicle, enabling the user to have their fingerprint read when they are outside the vehicle. The user identification field may then contain data permitting the user's fingerprint to be identified: for example it may be an image of the user's fingerprint, a vector definition of the user's fingerprint a definition in another form of the user's fingerprint or a hash of a definition of the user's fingerprint. This information could be provided in plaintext form in the relevant record in the corpus. Alternatively it may be transmitted in an encrypted form that can be decrypted by the processor of the vehicle, e.g. using its private key. This can help maintain the secrecy of the user's fingerprint since the vehicle can be assumed to be trusted by the provider.

2. In an alternative to example 1, the user interface apparatus may be a reader for biometric data other than fingerprints: for example an iris scanner, a facial recognition camera or a palm recognition camera. Again, the reader is exposed to the exterior of the vehicle so that the user's relevant biometric feature(s) may be read by the vehicle when the user is external to the vehicle. Analogously to example 1, data to permit the vehicle to verify the user's relevant biometric feature(s) is incorporated in the record authorising the vehicle to permit the user to access the vehicle.

3. The record authorising the vehicle to permit the user to access the vehicle may incorporate the user's public key. When the user comes to attempt to gain access to the vehicle, the vehicle may transmit a challenge to the user. For example, the processor 14 of the vehicle may generate a random number as a challenge and provide that to the user by means of the user interface. The user may then provide a response which is a function of the challenge and the user's private key. The response may be provided to the vehicle through the user interface. The processor 14 of the vehicle may then authenticate the response by means of the user's public key as contained or identified in the record authorising the user to use the vehicle. If the user is authenticated then, as discussed above, the processor may operate the door locks and/or drive management system to permit the user to access the vehicle. In this example, some suitable forms for the user interface are:

- A display and keypad. These would be positioned so that they are usable from outside the vehicle. The processor of the vehicle may cause the display to display the challenge. The user may have access to a portable device (e.g. a dedicated device or a smartphone having an app for this purpose) into which they enter the challenge. That device stores the user's private key and generates and displays the response. The user can then type the response into the keypad on the vehicle, from which it is provided to the processor of the vehicle.
- A wireless communications interface. This could be capable of communicating with a portable device carried by the user (e.g. a dedicated device or a smartphone having an app for this purpose). The interface could automatically transmit the challenge to the user's device, which stores the user's private key and could be configured to automatically generate the response and transmit it to the interface, from which it is provided to the processor of the vehicle.

The vehicle locks controlled by the processor 14 to enable or disable use of the vehicle may act on any relevant function of the vehicle. For example, they could lock any of the door(s), brake(s), steering or drive of the vehicle.

To help secure the vehicle it is preferred that the user input device is configured for only receiving user input from short range: for example from less than 10 m, less than 5 m, less then 2 m, less than 1 m, less than 10 cm or in contact of/with the user input device. For example, the user input device could be a keypad (either having movable keys, non-moveable keys or a touchscreen), a camera (e.g. for sensing bodily features such as facial features), In the examples given above, asymmetric public/private key protocols are used. The system may use other protocols with suitable variation, for example a Diffie-Hellman protocol.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
    a locking mechanism for securing the vehicle;
    a user input device exposed to an exterior of the vehicle and mounted to the vehicle, the user input device being configured to receive input through contact with one or more input devices;
    a transceiver for communicating with a network external to the vehicle; and
    a processor configured for implementing a public/private key security algorithm and coupled to the transceiver for sending and receiving data by means of the transceiver, and coupled to the locking mechanism for disengaging the locking mechanism to permit access to the vehicle; the processor being configured to:
        receive from the transceiver a data block including a first token, the first token representing a public key of a user, the public key identifying the user;
        receive from the user input device a second token, the second token being input through the contact with the user input device;
        compare the first and second tokens to determine whether the second token is consistent with having been derived from a private key that forms a key pair with the public key that identifies the user; and
        if that determination is positive, determine that the user is authenticated and cause the locking mechanism to be disengaged.

2. A vehicle as claimed in claim 1, wherein the data block is part of a data corpus authenticated by a distributed authentication protocol, and the processor is configured to participate in the protocol to collaboratively authenticate data in the data corpus.

3. A vehicle as claimed in claim 2, wherein the protocol is a blockchain protocol.

4. A vehicle as claimed in claim 2, wherein the protocol is such that data in the data corpus is authenticated through a consensus protocol.

5. The vehicle as claimed in claim 1, wherein the locking mechanism is configured to secure an external door of the vehicle.

6. The vehicle as claimed in claim 1, wherein the locking mechanism is configured for securing a motive power source of the vehicle.

7. The vehicle as claimed in claim 1, wherein the data block forms part of a series of commonly authenticated data blocks, and the processor is configured to detect usage of the vehicle and to add data to the series, the data being indicative of the usage of the vehicle.

8. The vehicle as claimed in claim 7, wherein the data indicative of the usage of the vehicle is representative of one or more of: distance travelled by the vehicle, fuel consumed by the vehicle, acceleration of the vehicle, deceleration of the vehicle, maximum speed of the vehicle.

9. A method for operating a vehicle comprising a locking mechanism for securing the vehicle, a user input device exposed to an exterior of the vehicle and mounted to the vehicle, the user input device being configured to receive input through contact with one or more input devices, a transceiver for communicating with a network external to the vehicle, and a processor configured for implementing a public/private key security algorithm and coupled to the transceiver for sending and receiving data by means of the transceiver, and coupled to the locking mechanism for disengaging the locking mechanism to permit access to the vehicle; the method comprising the processor performing the steps of:
    receiving from the transceiver a data block including a first token, the first token representing a public key of a user, the public key identifying the user;
    receiving from the user input device a second token, the second token being input through the contact with the user input device;
    comparing the first and second tokens to determine whether the second token is consistent with having been derived from a private key that forms a key pair with the public key that identifies the user; and
    if that determination is positive, determining that the user is authenticated and causing the locking mechanism to be disengaged.

* * * * *